US012637586B2

(12) United States Patent
Kim et al.

(10) Patent No.: US 12,637,586 B2
(45) Date of Patent: May 26, 2026

(54) METHOD OF MANUFACTURING A STAINLESS STEEL SHEET HAVING ETCHING PATTERNS

(71) Applicant: POSCO CO., LTD, Pohang-si (KR)

(72) Inventors: Jin-Tae Kim, Gwangyang-si (KR);
Ha-Na Choi, Gwangyang-si (KR);
Yang-Ho Choi, Gwangyang-si (KR);
Jung-Hwan Lee, Gwangyang-si (KR);
Yon-Kyun Song, Gwangyang-si (KR);
Jong-Kook Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/352,933

(22) Filed: Jul. 14, 2023

(65) Prior Publication Data

US 2023/0357598 A1      Nov. 9, 2023

Related U.S. Application Data

(62) Division of application No. 15/776,254, filed as application No. PCT/KR2016/013582 on Nov. 24, 2016, now abandoned.

(30) Foreign Application Priority Data

Dec. 2, 2015      (KR) ........................ 10-2015-0170497

(51) Int. Cl.
*C09D 183/06*          (2006.01)
*B05D 3/06*            (2006.01)
(Continued)

(52) U.S. Cl.
CPC .......... *C09D 183/06* (2013.01); *B05D 3/067* (2013.01); *B05D 7/14* (2013.01); *B05D 7/52* (2013.01);
(Continued)

(58) Field of Classification Search
CPC ...... C09D 183/06; C09D 5/08; C09D 183/08; C09D 7/47; C09D 11/101; B05D 3/067;
(Continued)

(56) References Cited

U.S. PATENT DOCUMENTS

2002/0144629 A1* 10/2002 Malkki ................... C09B 61/00
106/217.01
2010/0273013 A1* 10/2010 Jin .......................... C23C 22/46
428/447
(Continued)

FOREIGN PATENT DOCUMENTS

JP          2004183015          7/2004
JP          2004183015 A  *  7/2004  ............. C23C 22/40
(Continued)

OTHER PUBLICATIONS

Etching (2012). Dictionary of Metals.ASM International. Retrieved from https://app.knovel.com/hotlink/toc/id:kpDM00000A/dictionary-of-metals/dictionary-of-metals (Year: 2012).*

(Continued)

*Primary Examiner* — Christina H.W. Rosebach
(74) *Attorney, Agent, or Firm* — CANTOR COLBURN LLP

(57)          ABSTRACT

Provided is a manufacturing method of a stainless steel sheet having etching patterns. The method includes: coating a coating composition on a stainless steel sheet to form a coating layer; and forming a matte coated film layer, having an etching effect, on the coating layer. The coating composition comprises: 10 to 30 wt % of a silane-based compound, 0.5 to 6 wt % of an organic acid, 0.1 to 3 wt % of a vanadium compound, 0.1 to 3 wt % of a magnesium compound, and a remainder of a solvent.

11 Claims, 1 Drawing Sheet

(51) Int. Cl.

| | |
|---|---|
| *B05D 7/00* | (2006.01) |
| *B05D 7/14* | (2006.01) |
| *B41M 1/28* | (2006.01) |
| *B41M 5/00* | (2006.01) |
| *C08L 75/04* | (2006.01) |
| *C09D 5/08* | (2006.01) |
| *C09D 7/47* | (2018.01) |
| *C09D 11/101* | (2014.01) |
| *C09D 183/08* | (2006.01) |
| *C08K 3/22* | (2006.01) |
| *C08K 3/36* | (2006.01) |
| *C08K 5/09* | (2006.01) |
| *C08K 5/52* | (2006.01) |
| *C08K 5/56* | (2006.01) |

(52) U.S. Cl.
CPC ............ *B41M 1/28* (2013.01); *B41M 5/0047* (2013.01); *C08L 75/04* (2013.01); *C09D 5/08* (2013.01); *C09D 7/47* (2018.01); *C09D 11/101* (2013.01); *C09D 183/08* (2013.01); *B05D 2202/15* (2013.01); *C08K 3/22* (2013.01); *C08K 2003/222* (2013.01); *C08K 2003/2227* (2013.01); *C08K 3/36* (2013.01); *C08K 5/09* (2013.01); *C08K 5/52* (2013.01); *C08K 5/56* (2013.01); *C08L 2201/10* (2013.01)

(58) Field of Classification Search
CPC ........ B05D 7/14; B05D 7/52; B05D 2202/15; B41M 1/28; B41M 5/0047; C08L 75/04; C08L 2201/10; C08K 3/22; C08K 3/36; C08K 5/09; C08K 2003/2227; C08K 5/52; C08K 5/56; C08K 2003/222; C23C 22/40; C08G 77/14; C08G 77/26
See application file for complete search history.

(56) References Cited

U.S. PATENT DOCUMENTS

| | | | |
|---|---|---|---|
| 2013/0079433 A1* | 3/2013 | Lindner ................ | C09C 1/3081 |
| | | | 524/588 |
| 2013/0295292 A1 | 11/2013 | Bukeikhanova et al. | |
| 2017/0354991 A1 | 12/2017 | Kim et al. | |

FOREIGN PATENT DOCUMENTS

| | | | | | |
|---|---|---|---|---|---|
| JP | 2005120469 | | 5/2005 | | |
| JP | 2008308231 | | 12/2008 | | |
| JP | 2008544088 | | 12/2008 | | |
| JP | 2009274341 | | 11/2009 | | |
| JP | 2010106619 | | 5/2010 | | |
| JP | 2010106619 A | * | 5/2010 | | |
| JP | 2013142104 | | 7/2013 | | |
| JP | 2013142104 A | * | 7/2013 | | |
| KR | 20000032658 | | 6/2000 | | |
| KR | 20030011320 | | 2/2003 | | |
| KR | 20050014771 | | 2/2005 | | |
| KR | 20060133164 | | 12/2006 | | |
| KR | 101195897 | | 10/2012 | | |
| KR | 101387638 | | 4/2014 | | |
| KR | 20140040996 | | 4/2014 | | |
| KR | 101459359 | | 11/2014 | | |
| KR | 20150004960 | | 1/2015 | | |
| KR | 20160077577 | | 7/2016 | | |
| KR | 100685028 B1 | * | 2/2020 | ............. | C23C 22/40 |

OTHER PUBLICATIONS

Translation of JP 2010106619 by Nishikawa et al. (Year: 2010).*
Translation of JP 2004183015 by Honda et al. (Year: 2004).*
Translation of JP 2013142104 by Kito et al. (Year: 2013).*
Hilberer. "Antifoaming agents". Encyclopedia of Polymer Science and Technology. Copyright 2011 John Wiley & Sons, Inc. (Year: 2011).*
DeArmitt, C. "Functional Fillers for Plastics" Applied Plastics Engineering Handbook. 2011. pp. 455-467 (Year: 2011).*
Hilberer et al., 2012, Antifoaming Agents. In Encyclopedia of Polymer Science and Technology, (Ed.). https://doi.org/10.1002/0471440264.pst411.pub2.
International Search Report—PCT/KR2016/013582 dated Feb. 28, 2017.
Japanese Office Action—Japanese Application No. 2018-528259 issued on Jun. 11, 2019, citing JP 2008-544088, JP 2004-183015, JP 2005-120469, US 2013/0295292, KR 10-1195897, JP 2013-142104, JP 2010-106619 and JP 2008-308231.
Kutz, Applied Plastics Engineering Handbook—Processing and Materials—26.6 Optical Properties by C. DeArmitt, Elsevier. Retrieved from https://app.knovel.com/hotlink/pdf/id:kt0098R1Q1/applied-plastics-engineering/color (Year: 2011).
Munger et al., Corrosion Prevention by Protective Coatings (3rd Edition)—8.1.1.1 Low-Alloy Steels, NACE International. Retrieved from https://app.knovel.com/hotlink/pdf/id:kt01191H09/corrosion-prevention/low-alloy-steels, 2014.

* cited by examiner

1

METHOD OF MANUFACTURING A STAINLESS STEEL SHEET HAVING ETCHING PATTERNS

TECHNICAL FIELD

The present disclosure relates to a coating composition having excellent corrosion resistance and fingerprint resistance, a stainless steel sheet having etching patterns, and a manufacturing method therefor.

BACKGROUND ART

Usually, a printed steel sheet is manufactured as a printed steel sheet having a design formed thereon, using a roll printing or a silk screen process; however, a stainless steel sheet is manufactured as a stainless steel sheet having a design formed thereon by etching the design with an acid or performing direct engraving.

However, in the case of etching with an acid or engraving a stainless steel sheet, it may be difficult to apply various patterns or designs, and the resolution of patterns, designs and the like is low. In particular, in the case of forming patterns by the method of etching a stainless steel sheet with an acid, pattern printing is performed on the stainless steel sheet with a polymer resin, and then the part of the steel sheet with no pattern print is dissolved with the acid by acid etching to form etching patterns in stainless steel materials, and the polymer pattern printed part is redissolved to reveal the material. Therefore, since a product is produced through the following steps: polymer pattern printing-drying-acid etching-washing-polymer pattern removing-washing, the process is complicated, and the operation costs may be high.

Accordingly, in order to prevent such problems, a method of forming a coated film layer having adjustable gloss on a stainless steel sheet to form patterns is used. By adjusting the gloss so that the coated film layer has a matting effect, an etching effect, identical to that obtained when forming patterns with a method of acid-etching or engraving a stainless steel sheet, may be exhibited. As the method of allowing the coated film layer to have a matting effect, for example, a coating material including silica, a matting agent, may be coated on a stainless steel sheet to form patterns, thereby manufacturing a stainless steel sheet having a coated film layer having an etching effect formed thereon.

However, this method has a problem in that corrosion may occur on the portion of the stainless steel sheet on which the coated film layer is not formed, and also, the stainless steel sheet may be easily contaminated with fingerprints or pollutants, which may not be easily removed therefrom, and thus, it may be difficult to maintain the value as a product and secure product quality. Moreover, when forming the coated film layer having a matting effect by the ink jet, roll print or silk screen printing, adhesive strength between the stainless steel sheet and the coated film layer is poor, so that the coated film layer may be easily peeled off.

DISCLOSURE

Technical Problem

An aspect of the present disclosure is to provide a coating composition having corrosion resistance and fingerprint resistance, a stainless steel sheet having excellent corrosion resistance and fingerprint resistance even on the portion on which a matte coated film layer having a matting effect is not formed, and a manufacturing method therefor.

Technical Solution

According to an aspect of the present disclosure, a coating composition including: 10 to 30 wt % of a silane-based compound, 0.5 to 6 wt % of an organic acid, 0.1 to 3 wt % of a vanadium compound, 0.1 to 3 wt % of a magnesium compound, and a remainder of a solvent is provided.

The coating composition may further include 1 to 2 wt % of a wetting agent, and 0.01 to 1 wt % of a defoamer.

The silane-based compound may be one or more selected from the group consisting of epoxy-based silane and amino-based silane.

The organic acid may be one or more selected from the group consisting of formic acid, acetic acid and phosphoric acid.

According to another aspect of the present disclosure, a stainless steel sheet having etching patterns including: a stainless steel sheet, a coating layer, formed on the stainless steel sheet and comprising a cured product of the coating composition, and a matte coated film layer, formed on the coating layer and having a matting effect is provided.

The coating layer may have a thickness of 0.1 to 10 μm.

The coating layer may have a gloss of 80 or more at 60°.

The coated film layer may include a matting agent.

The matting agent may be one or more selected from the group consisting of silica, alumina, wax, ceramic and synthetic polymer powder.

The coated film layer may include a plurality of bubbles.

The bubbles may have an average diameter of 0.5 to 3 μm.

The coated film layer may have a thickness of 1 to 20 μm.

The coated film layer may have a gloss of 3 to 50 at 60°.

According to another aspect of the present disclosure, a manufacturing method of a stainless steel sheet having etching patterns, including: coating the coating composition on a stainless steel sheet to form a coating layer, and forming a coated film layer, having an etching effect, on the coating layer is provided.

The coated film layer may be formed by coating a coating material including a matting agent on the coating layer, and then curing the coating material.

The coated film layer may be formed by a method including ejecting a transparent ink onto the coating layer, and performing UV curing within two seconds, immediately after ejecting the transparent ink.

The ejecting may be performed by an ink jet printer or a laser printer.

The ejecting speed of the transparent ink in the ejecting may be 1 to 20 KHz.

Advantageous Effects

As set forth above, according to an exemplary embodiment in the present disclosure, the coating composition of the present disclosure has excellent corrosion resistance and fingerprint resistance, and the coating layer obtained by curing the coating composition is transparent and has high gloss, thereby expressing the surface characteristics of the stainless steel sheet as they are.

In addition, the stainless steel sheet having etching patterns of the present disclosure has excellent corrosion resistance and fingerprint resistance even on the portion on which the etching patterns are not formed, and the manufacturing method of the stainless steel sheet has a simple and costsaving process as compared with the conventional etching pattern forming method, and thus, is economical.

BEST MODE FOR INVENTION

Figure 1:
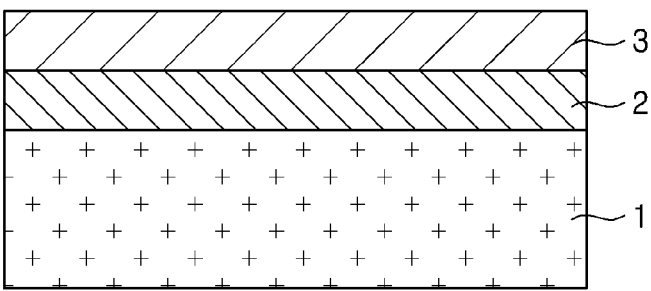
FIG. 1 is a drawing schematically representing a section of Example 4.

Hereinafter, preferable embodiments of the present disclosure will be described with reference to the accompanying drawings. However, the embodiments of the present disclosure may be modified to have many different forms and the scope of the disclosure is not limited to the embodiments set forth herein.

The present disclosure relates to a coating composition having excellent corrosion resistance and fingerprint resistance, a stainless steel sheet having etching patterns, and a manufacturing method therefor.

The coating composition of the present disclosure may include 10 to 30 wt % of a silane-based compound, 0.5 to 6 wt % of an organic acid, 0.1 to 3 wt % of a vanadium compound, 0.1 to 3 wt % of a magnesium compound, and a remainder of a solvent.

Meanwhile, the coating composition may further include 1 to 2 wt % of a wetting agent, and 0.01 to 1 wt % of a defoamer.

The coating composition includes the vitreous silane-based compound, thereby expressing the surface characteristics of a parent material coated with the coating composition as they are. That is, since the coating composition is a transparent and high gloss solution, it may express the high gloss of the stainless steel sheet as it is. The silane-based compound may be preferably for example, one or more selected from the group consisting of silane-based epoxy-based silane and amino-based silane, but not limited thereto. The epoxy-based silane may be one or more selected from the group consisting of 3-glycidoxypropyltrimethoxysilane, 3-glycidoxypropylmethyldiepoxysilane and 3-glycidoxy-propyltriethoxysilane. Meanwhile, the amino-based silane may be one or more selected from the group consisting of 3-aminopropyltriethoxysilane, bis-tert-butylaminosilane, diisopropylaminosilane disilylamine and trisilylamine.

It is preferable that the content of the silane-based compound is 10 to 30 wt %, and when the content of the silane-based compound is less than 10 wt %, corrosion resistance and adhesiveness are deteriorated, and when the content is more than 30 wt %, solution stability is lowered, and thus, not preferable.

The organic acid included in the coating composition of the present disclosure is a material required to improve adhesiveness between the stainless steel sheet and the coating layer, and the type is not particularly limited; however, for example, one or more selected from the group consisting of formic acid, acetic acid and phosphoric acid are preferable. It is preferable that the content of the organic acid is 0.5 to 6 wt %, and when the content of the organic acid is less than 0.5 wt %, adhesiveness between the stainless steel sheet and the coating layer is lowered so that the coating layer may be released, and when the content is more than 6 wt %, stability of the solution and the physical properties of the coated film are deteriorated.

The vanadium compound and the magnesium compound form a stable metal chelate compound by inducing a chelate reaction, which leads higher binding strength between metal atoms of the steel sheet and the coating layer, thereby having excellent corrosion resistance and adhesiveness of the coated layer.

The vanadium compound may be one or more selected from the group consisting of vanadyl acetylacetonate, vanadium (V) oxide, metavanadic acid, ammonium metavanadate, sodium metavanadate, vanadium oxytrichloride, vanadium (III) oxide, vanadium dioxide, vanadium oxysulfate, vanadium oxyacetylacetate, vanadium acetylacetate and vanadium (III) chloride. It is preferable that the content of the vanadium compound is 0.1 to 3 wt %, and when the content of the vanadium compound is less than 0.1 wt %, the metal chelate compound is difficult to be formed, and when the content is more than 3 wt %, unreacted metal compounds remain to deteriorate the physical properties of the solution.

The magnesium compound may be one or more selected from the group consisting of magnesium oxide, magnesium sulfate, magnesium chloride and magnesium hydroxide. It is preferable that the content of the magnesium compound is 0.1 to 3 wt %, and when the content of the magnesium compound is less than 0.1 wt %, the metal chelate compound is difficult to be formed, and when the content is more than 3 wt %, unreacted metal compounds remain so that the physical properties of the solution is deteriorated.

The wetting agent may be one or more selected from the group consisting of isopropyl alcohol, 2-ethyl-1-hexanol, 2-buthoxyethanol, dipropyleneglycol, ethylene glycol, n-propyl alcohol, propylene glycol and polysiloxane copolymer series. It is preferable that the content of the wetting agent is 1 to 2 wt %, and when the content of the wetting agent is less than 1 wt %, a wettability improvement effect is deteriorated, and adhesive strength of the coating layer is lowered, and when the content is more than 2 wt %, the physical properties are not lowered, but there is also no wettability improvement effect, which is not economically preferable.

The bubbles produced in the coating composition, causing surface defects such as cratering or weakened strength of the coating layer, may occur in several steps in the process, and thus, it is preferable to use a defoamer. As the defoamer, N-methylethanolamine may be used, and the content of the defoamer is preferably 0.01 to 1 wt %. When the content of the defoamer is less than 0.01 wt %, the defoaming effect may be poor, and when the content is more than 1 wt %, corrosion resistance may be lowered and the adhesive strength of the coating layer may be decreased.

FIG. 1 is a drawing schematically representing the section of the stainless steel sheet having etching patterns which is an exemplary embodiment of the present disclosure, and hereinafter, the stainless steel sheet having etching patterns will be described in detail.

An exemplary embodiment of the present disclosure may provide a stainless steel sheet having etching patterns including: a stainless steel sheet 1, a coating layer 2, formed on the stainless steel sheet and comprising a cured product of the coating composition, and a matte coated film layer 3, formed on the coating layer and having a matting effect.

Usually, as the method of forming etching patterns on the stainless steel sheet 1, there are methods of acid etching, engraving, and the like, however, these methods are difficult to use to apply various patterns or designs, the resolution of the patterns and designs is low, and the process is complicated. Accordingly, a method of forming a coated film layer having a matting effect on a stainless steel sheet to form patterns is used.

Meanwhile, the coated film layer having a matting effect is formed on the stainless steel sheet and represents an etching effect like forming patterns by an acid etching method on the stainless steel sheet, and in the present disclosure, the coated film layer having a matting effect is set as a 'matte coated film layer 3.'

The matte coated film layer 3 is formed on the stainless steel sheet 1 and may represent an etching effect like forming etching patterns, and in addition, the stainless steel sheet having the matte coated film layer formed thereon may have excellent physical properties such as corrosion resistance and fingerprint resistance. However, there is a problem in that corrosion resistance, fingerprint resistance and fouling resistance are deteriorated on the portion of the stainless steel sheet on which the matte coated film layer is not formed. Moreover, when forming the matte coated film layer by the method of ink jet, roll print or silk screen printing, adhesive strength between the stainless steel sheet and the matte coated film layer is poor, so that the matte coated film layer is easily peeled off.

However, the present disclosure forms the coating layer 2 on the stainless steel sheet 1 and the matte coated film layer 3, thereby improving corrosion resistance, fingerprint resistance and fouling resistance on the portion of the stainless steel sheet on which the matte coated film layer is not formed, and improving adhesive strength between the stainless steel sheet and the matte coated film layer.

The coating layer 2 is obtained by curing the coating composition of the present disclosure, and may include a silane-based compound, an organic acid, a vanadium compound, a magnesium compound and a defoamer. Meanwhile, since the coating layer including the silane-based compound is transparent and has high gloss, it may represent the surface characteristics of the stainless steel sheet as they are.

The coating layer 2 has a thickness of preferably 0.1 to 10 μm, and most preferably 0.5 to 5 μm. When the thickness of the coating layer is less than 0.1 μm, corrosion resistance is poor, and when the thickness is greater than 10 μm, processability is poor, and manufacturing costs also increase. In addition, it is preferable that the coating layer 2 have a gloss of 80 or more at 60°. When the gloss of the coating layer is less than 80, the coating layer may not express the surface characteristics of the stainless steel sheet 1 as they are. Therefore, since the high gloss of the stainless steel sheet may not be expressed as it is, the part on which the matte coated film layer 3 is formed, and the part on which the matte coated film layer is not formed are not clear, thereby decreasing the etching effect.

Since the matte coated film layer 3 formed on the coating layer 2 has the matting effect, etching patterns may be formed on the stainless steel sheet 1. It is preferable to include a matting agent in order that the matte coated film layer has the matting effect. The matting agent may be one or more selected from the group consisting of silica, alumina, wax, ceramic and a synthetic polymer powder. Meanwhile, it is preferable that the matting agent have an average particle diameter of 1 to 30 μm, and when the average particle diameter of the matting agent is more than 30 μm, the surface of the matte coated film layer is rough, so that the appearance is poor and anti-scratch properties are lowered.

In order to impart the matting effect to the matte coated film layer 3, the present disclosure may provide a matte coated film layer including a plurality of bubbles, in addition to providing the matte coated film layer including the matting agent, as described above. The matte coated film layer including a plurality of bubbles may be manufactured by a method of ejecting a transparent ink onto the coating layer by a printing technique to produce micro-sized bubbles, and then UV-curing the transparent ink.

The matte coated film layer 3 including a plurality of bubbles may represent the matting effect by producing diffused reflection of light in the bubbles. Thus, the part (pattern) of the coating layer 2 formed on the stainless steel sheet 1 on which the matte coated film layer is formed may represent the matting effect. Therefore, the matte coated film layer including a plurality of bubbles may be formed on the coating layer, thereby representing an etching effect like direct etching or engraving on the stainless steel sheet. It is preferable that the bubbles have an average diameter of 0.5 to 3 μm, and when the average diameter is less than 0.5 μm, the size of the bubbles may be unduly small, so that the effect of diffused reflection of light is deteriorated, and when the average diameter is more than 3 μm, the effect of diffused reflection of light is excellent, but the air layer of bubbles are unduly increased to weaken the physical properties of the matte coated film layer.

It is preferable that the matte coated film layer 3 have a thickness of 1 to 20 μm, and when the thickness is lower than 1 μm, the matting effect is deteriorated to have no effect as an etching steel sheet, and when the thickness is greater than 20 μm, the matting effect is excellent due to the bubbles of the printed coated film, but the coated film may be peeled off.

Meanwhile, it is preferable that the matte coated film layer 3 have a surface gloss of 3 to 30 at 60°. When the surface gloss is less than 3, the etching effect is excellent, but the number of bubbles should be very large, and thus, the physical properties of the printed coated film may be relatively weakened, and when the surface gloss is more than 50, the etching effect is not shown on the matte coated film layer.

According to another exemplary embodiment of the present disclosure, a manufacturing method of a stainless steel sheet having etching patterns, including: coating the coating composition on a stainless steel sheet 1 to form a coating layer 2, and forming a matte coated film layer 3 having an etching effect on the coating layer may be provided.

Before forming the coating layer 2 on the stainless steel sheet 1, pollutants on the surface of the stainless steel sheet may be removed. As a method of removing the pollutants, for example, an acetone degreasing or alkaline degreasing solution is used to remove organic and inorganic pollutants attached to the surface of the stainless steel sheet. When using the acetone degreasing solution, the stainless steel sheet is immersed in an acetone solution, or the surface of stainless steel is cleaned with gauze soaked in acetone. Meanwhile, when using the alkaline degreasing solution, the stainless steel sheet is immersed in a decreasing solution including an alkali, is washed with water and dried. Here, as the concentration of alkali and the immersion time, a usually used condition may be utilized, but it is preferable to perform immersion until the pollutants on the surface of the stainless steel sheet are completely removed.

The coating composition may be coated on the stainless steel sheet 1 from which pollutants are removed to form the coating layer 2. The coating composition is transparent and has high gloss, so that it may express the surface characteristics of the stainless steel sheet as they are, and thus, etching patterns may be formed on the stainless steel sheet while maintaining high gloss of the stainless steel sheet as it is. In addition, by forming the coating layer on the stainless steel sheet, the stainless steel sheet having etching patterns of the present disclosure has an effect of excellent corrosion resistance and fingerprint resistance.

The method of coating the coating composition may be one selected from the methods, for example, roll coating, spray coating, slot coating, impregnation coating, curtain coating and the like, but is not limited thereto. It is preferable that the thickness of the coating layer 2 be controlled to 0.1 to 10 μm. When the thickness of the coating layer is less than 0.1 μm, corrosion resistance is poor, and when the thickness is greater than 10 μm, processability is poor, and also manufacturing costs increase.

On the coating layer 2, the matte coated film layer 3 having an etching effect may be formed. The matte coated film layer may be formed by coating a coating material including a matting agent on the coating layer, and then curing the coating material. The matting agent may be one or more selected from the group consisting of silica, alumina, wax, ceramic and synthetic polymer powder. Meanwhile, it is preferable that the matting agent have an average particle diameter of 1 to 30 μm, and when the average particle diameter of the matting agent is more than 30 μm, the surface of the matte coated film layer is rough, so that the appearance is poor and anti-scratch properties are lowered.

However, the method of imparting the matting effect of the matte coated film layer 3 using the matting agent has a problem in that when adding a large amount of matting agent to the coating material for adjusting the matting effect by adjusting the content of the matting agent, the hardness of the matte coated film layer is increased, and processability is weakened. In addition, it is difficult to solve the problem of decreased resolution, and even in the case of applying the matting agent to a printing process in order to increase the resolution, the several micro-sized matting agent blocks an ink injection nozzle.

Therefore, the present disclosure provides a method of forming a matte coated film layer which solves the problem in the method of forming the matte coated film layer 3 using the matting agent. That is, a method of forming a matte coated film layer including ejecting a transparent ink onto the coating layer 2, and performing UV curing within two seconds of ejecting the transparent ink may be provided.

The present disclosure may express etching patterns having a matting effect, by ejecting a transparent ink onto the coating layer 2 by a printing technique to produce micro-sized bubbles, which are UV-cured immediately thereafter. That is, when diffused reflection of light occurs in the bubbles, the matte coated film layer including the bubbles has a matting effect, and thus, the stainless steel sheet having a matte coated film layer formed by a printing technique may include patterns having an etching effect without proceeding with an etching process.

In order to maintain the bubbles, it is preferable to cure a transparent ink in a short time within two seconds of ejecting the transparent ink on the coating layer 2 by a printing technique. In the case that more than two seconds have passed from ejecting the transparent ink to the start of curing, the bubbles formed on the coating layer disappear so that the diffused reflection of light does not occur, thereby deteriorating the matting effect of the matte coated film layer 3. Therefore, the etching effect of the etching patterns formed on the stainless steel sheet of the present disclosure may be deteriorated.

Meanwhile, in order to cure the matte coated film layer in a short time for maintaining the bubbles included in the matte coated film layer 3, it is preferable to use a UV curing method, and in order to use the UV curing method, it is preferable to include a photoinitiator in the coating material forming the matte coated film layer.

The transparent ink may be a mixture of one or more resin components selected from the group consisting of polymer-based, epoxy-based, urethane-based and ester-based acrylate oligomers such as polyester, modified polyester and high-polymer polyester, but not limited thereto.

The ejection of the transparent ink may be usually performed using any equipment capable of ejecting ink without limitation, and for example, may be performed by an ink jet printer or a laser printer. In addition, it is preferable that the ejection speed of the transparent ink is 1 to 20 kHz, and when the ejection speed is less than 1 kHz, the bubbles are not sufficiently produced, so that the matting effect is not represented in the matte coated film layer 3, and when the ejection speed is more than 20 kHz, an excessive amount is ejected, so that desired patterns may not be expressed.

It is preferable to control the thickness of the matte coated film layer 3 to 1 to 20 μm, and when the thickness is lower than 1 μm, the matting effect is deteriorated to have no effect as a stainless steel sheet having etching patterns, and when the thickness is greater than 20 μm, the matting effect is excellent due to the bubbles, but the coated film may be peeled off.

[Mode for Invention]

Hereinafter, the present disclosure will be described in detail through the specific examples. The following example is only illustrative for assisting in the understanding of the present disclosure, and the scope of the present disclosure is not limited thereto.

EXAMPLE

1. Preparation of Coating Composition

A silane-based compound, an organic acid, a vanadium compound and a magnesium compound were added to a solvent, and then stirred to prepare a coating composition, and as the solvent, a mixture of water and ethanol was used. As the silane-based compound, 3-glycidoxypropyl trimethoxysilane and 3-aminopropyl triethoxysilane were used, and the mixing ratio thereof was controlled to 1:1. In addition, formic acid and phosphoric acid were used as the organic acid, vanadyl acetylacetonate was used as the vanadium compound, and magnesium oxide was used as the magnesium compound.

The composition and each content included in the coating composition were adjusted as described in the following Table 1 to prepare the coating compositions of Examples 1 to 3, and Comparative Examples 1 to 5.

TABLE 1

| (Unit: wt %) | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Silane compound | 30 | 20 | 10 | 12 | 6 | 30 | 10 | 5 |
| Formic acid | 3 | 1 | 0.5 | 3 | 3 | — | — | — |
| Phosphoric acid | 3 | 1 | 0.5 | 3 | 3 | — | — | — |

TABLE 1-continued

| (Unit: wt %) | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Vanadyl acetylacetonate | 0.5 | 0.5 | 0.5 | 0.5 | 0.5 | 0.5 | 0.5 | 0.5 |
| Magnesium oxide | 2 | 2 | 2 | 2 | 2 | 2 | 2 | 2 |
| Urethane resin | — | — | — | 8 | 24 | — | 20 | 25 |
| Solvent | 61.5 | 75.5 | 86.5 | 71.5 | 61.5 | 67.5 | 67.5 | 67.5 |

2. Preparation of Stainless Steel Sheet Having Etching Patterns Printed Thereon

On a stainless steel sheet 1 having a width of 20 cm×a length of 20 cm, the coating compositions of Examples 1 to 3 and Comparative Example 1 to 5 were coated to a thickness of 5 μm to form a coating layer 2. On the coating layer, a transparent UV curable ink, not including a pigment, was ejected by an ink jet printer to print patterns. The ejection speed of the transparent UV curable ink was 12 khz, and within one second of ejecting the transparent UV curable ink, UV curing was performed to form the matte coated film layer 3. This process of performing UV curing immediately after ejecting was performed through a continuous process.

Experimental Example 1: Test of Physical Properties Depending on Content of Composition Included in Coating Composition The solution stability of the coating compositions of Examples 1 to 3, and Comparative Examples 1 to 5 was tested. In addition, the corrosion resistance, the coating layer adhesiveness, the matte coated film layer adhesiveness, the gloss, and the scratch resistance of the stainless steel sheets having the cured product (coating layer 2)) formed thereon of Examples 1 to 3 and Comparative Examples 1 to 5 as manufactured in the above 2 were tested and the results are shown in Table 2.

<Solution Stability>

The coating composition of Examples 1 to 3 and Comparative Examples 1 to 5 were stored for 1 month in a constant temperature apparatus at 40° C., and then the viscosity increase, gelling and precipitation of the composition were observed and evaluated according to the following criteria.

○ increased viscosity of solution, no change in gelling and precipitation.

X increased viscosity of solution, change in gelling and precipitation.

<Coating Layer Adhesiveness>

The coating layer adhesive strength is the measured adhesive strength between the stainless steel sheet 1 and the coating layer 2. According to the adhesive strength test method of the coating material of ISO 2409, a line was drawn at 1 mm intervals horizontally and vertically on a specimen, adhesive cellophane tape was attached thereto and then detached, and the adhesive strength was evaluated by the number of remaining pieces among 100 pieces of separated coating surface on the coated film.

○ the number of remaining pieces being 100

Δ the number of remaining pieces being equal to or more than 80 and less than 100

X the number of remaining pieces being less than 80

<Matte Coated Film Layer Adhesiveness>

The matte coated film layer adhesiveness is the measured adhesive strength between the matte coated film layer 3 and the coating layer 2. According to the adhesive strength test method of the coating material of ISO 2409, a line was drawn at 1 mm intervals horizontally and vertically on a specimen, adhesive cellophane tape was attached thereon and then detached, and the adhesive strength was evaluated by the number of remaining pieces among 100 pieces of separated coating surface on the coated film.

○ the number of remaining pieces being 100

Δ the number of remaining pieces being equal to or more than 80 and less than 100

X the number of remaining pieces being less than 80

<Corrosion Resistance>

On the stainless steel sheets having etching patterns of Examples 1 to 3 and Comparative Examples 1 to 5, 5% brine was continuously sprayed for 72 hours at a humidity of 35, 95%, thereby determining the corrosion resistance based on the initial corrosion control area.

○ corrosion control area being less than 5%

Δ corrosion control area being equal to or more than 5% and less than 20%

X corrosion control area being equal to or more than 50%

<Gloss>

The gloss of the stainless steel sheet having etching patterns of Examples 1 to 3 and Comparative Examples 1 to 5 was measured by a BYK glossmeter to evaluate the gloss (at) 60°.

<Scratch Resistance>

On the surface of the stainless steel sheets having etching patterns of Examples 1 to 3 and Comparative Examples 1 to 5, reciprocating actions were undertaken in the same direction as and in the direction perpendicular to the painting direction 20 times, respectively, with fingernails, and then scratch marks remaining the coated film were observed. The observation results were evaluated according to the following method.

○ Marks did not appear.

Δ Marks were slightly shown.

X Clear marks appeared.

TABLE 2

| | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Solution stability | ○ | ○ | ○ | X | X | ○ | ○ | ○ |

TABLE 2-continued

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Coating layer adhesiveness | ○ | ○ | ○ | ○ | ○ | Δ | X | X |
| Matte coated film layer adhesiveness | ○ | ○ | ○ | ○ | ○ | ○ | ○ | ○ |
| Corrosion resistance | ○ | ○ | ○ | ○ | ○ | Δ | Δ | Δ |
| Gloss | 95 | 93 | 80 | 69 | 35 | 95 | 45 | 30 |
| Scratch resistance | ○ | ○ | ○ | ○ | Δ | ○ | Δ | Δ |

As shown in the above Table 2, Examples 1 to 3 had overall excellent physical properties. Meanwhile, in Comparative Examples 1 and 2, precipitation occurred, so that solution stability was poor, and the gloss was lowered due to the urethane resin. In addition, in Comparative Examples 3 to 5, coating layer adhesiveness and corrosion resistance were deteriorated, and in Comparative Examples 4 and 5, the gloss was measured to be low. Meanwhile, Comparative Examples 3 to 5 were the compositions not including a phosphoric acid compound or an organic acid, and it was confirmed that in order to improve the adhesiveness between the stainless steel sheet 1 and the coating layer 2 to have excellent coating layer adhesiveness and corrosion resistance, it is important to add the phosphoric acid or organic acid.

Experimental Example 2: Physical properties test according to order in which coating layer and matte coated film layer are formed

Example 4

A stainless steel sheet 1 was cleaned using an acetone degreasing solution, and on the cleaned stainless steel sheet, the coating composition of Example 1 was coated, and then dried at the temperature of 160° C., thereby forming a coating layer 2 having a thickness of 5 μm. On the coating layer, a transparent UV curable ink, not including a pigment, was ejected by an ink jet printer to print patterns. The ejection speed of the transparent UV curable ink was 12 khz, and within one second of ejecting the transparent ink, UV curing was performed. The matte coated film layer 3 formed by curing the ink had a thickness of 10 μm, and this process of UV curing immediately after ejecting was performed by a continuous process. FIG. 1 corresponds to a drawing schematically representing a section of Example 4.

Comparative Example 6

Figure 2:
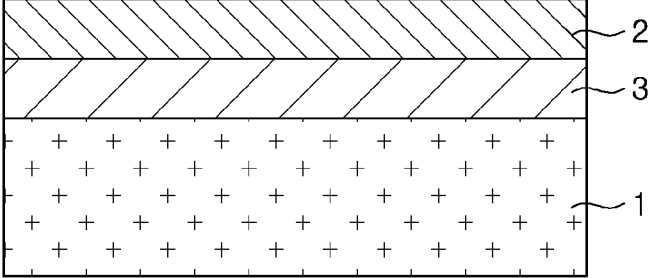
FIG. 2 is a drawing schematically representing a section of Comparative Example 6.

The matte coated film layer and the coating layer were formed, respectively, in the same manner as in the method of forming the matte coated film layer and the coating layer of Example 4, except that the matte coated film layer 3 is formed on the stainless steel sheet 1, and then the coating layer 2 is formed. FIG. 2 corresponds to a drawing schematically representing a section of Comparative Example 6.

Comparative Example 7

Figure 3:
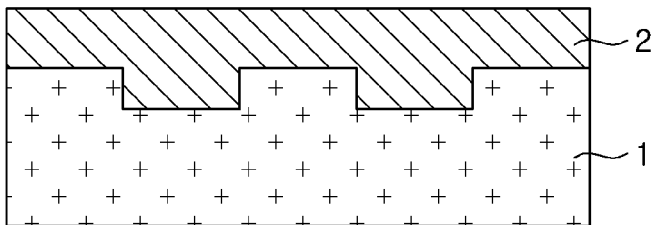
FIG. 3 is a drawing schematically representing a section of Comparative Example 7.

A stainless steel sheet 1 was washed using an acetone degreasing solution, and then etching patterns were formed on the surface of the stainless steel sheet by the acid etching method. Thereafter, a coating layer was formed in the same manner as in the method of forming the coating layer 2 of Example 4. FIG. 3 corresponds to a drawing schematically representing a section of Comparative Example 7.

Comparative Example 8

A stainless steel sheet 1 was washed using an acetone degreasing solution, and a matte coated film layer was formed in the same manner as in the method of forming the matte coated film layer 3 of Example 4, thereby implementing the etching effect, however, the coating layer was not formed.

Comparative Example 9

The surface of the stainless steel sheet 1 was etched by the acid etching method, but the coating layer was not further formed.

The corrosion resistance, fingerprint resistance, fouling resistance, coating layer adhesiveness, matte coated film layer adhesiveness and surface texture of Example 4 and Comparative Examples 6 to 8 were tested, and the results are shown in the following Table 3.

<Fingerprint Resistance>

On the surface of Examples 4 and Comparative Examples 6 to 9, a fingerprint was put and the fingerprint degree was observed with the naked eye at an angle of 20°, and evaluated by the following method.

○ Not clearly seen

Δ Seen a little

X Clearly seen

<Fouling Resistance>

On the surface of Example 4 and Comparative Examples 6 to 9, a fingerprint was made. Thereafter, the surface was wiped off with a soft cloth, and the number of wipes until the fingerprint was completely wiped off were counted and evaluated as follows.

○ Wiped off with 5 or less wipes

Δ Wiped off with 10 or less wipes

X 10 or more wipes required

<Surface Texture>

The surface texture of Example 4 and Comparative Examples 6 to 9 was evaluated, by evaluating texture felt when touching the surface with hands, and a three-dimensional effect seen with the naked eye.

○ Tactually and visually felt surface texture

X No surface texture

13

TABLE 3

| Classification | Example 4 | Comparative Example 6 | Comparative Example 7 | Comparative Example 8 | Comparative Example 9 |
|---|---|---|---|---|---|
| Corrosion resistance | ○ | ○ | ○ | X | X |
| Fingerprint resistance | ○ | Δ | Δ | X | X |
| Fouling resistance | ○ | ○ | ○ | X | X |
| Coating layer adhesiveness | ○ | ○ | ○ | — | — |
| Matte coated film layer adhesiveness | ○ | X | — | ○ | — |
| Surface texture | ○ | X | X | ○ | ○ |

As shown in the above Table 3, in Example 4, the adhesive strength between the stainless steel sheet 1 and the coating layer 2 was excellent so that there was no peeling, which leads excellent corrosion resistance. In addition, since the coating layer was formed also on the portion of the stainless steel sheet other than the region on which the matte coated film layer 3 was formed, the results of good fingerprint resistance and fouling resistance were shown. In addition, a three-dimensional effect was tactually and visually felt from the surface texture.

In Comparative Examples 6 and 7, since the coating layer adhesiveness was excellent, corrosion resistance and fouling resistance were excellent. However, since the adhesive strength between the matte coated film layer 3 and the stainless steel sheet 1 was low, in Comparative Example 6, the matte coated film layer was partially peeled off. Meanwhile, in Comparative Example 7, since the matte coated film layer was not formed, it is difficult to compare the adhesive strength of the matte coated film layer. Comparative Examples 6 and 7 had a structure in which the coating layer 2 is formed on the matte coated film layer, but the texture and the three-dimensional effect of the surface were insufficiently felt.

In Comparative Examples 8 and 9, since the coating layer 2 was not formed, the results of overall poor physical properties such as corrosion resistance, fingerprint resistance and fouling resistance were shown.

Hereinabove, the exemplary embodiments of the present disclosure were described in detail; however, the scope of rights of the present disclosure are not limited thereto, and it will be apparent to a person skilled in the art that various modifications and changes are possible within the scope not departing from the technical idea of the present invention.

What is claimed is:

1. A manufacturing method of a stainless steel sheet having patterns, comprising:
coating a coating composition on a stainless steel sheet to form a coating layer;
ejecting a coating material including i) a transparent ink or ii) a transparent ink and a matting agent onto the coating layer; and
performing UV curing within 2 seconds of ejecting the coating material to form a matte coated film layer on the coating layer, the matte coated film layer including a plurality of bubbles and having a matting effect,
wherein the coating composition comprises: 10 to 30 wt % of a silane-based compound, 0.5 to 6 wt % of an acid compound, 0.1 to 3 wt % of a vanadium compound, 0.1 to 3 wt % of a magnesium compound, and a remainder of a solvent,
the acid compound is one or more selected from the group consisting of organic acid and phosphoric acid, and
the coating layer has a thickness of 0.5 to 5 μm, and
wherein the patterns are formed by the matting effect.

2. The method of claim 1, wherein the ejecting is performed by an ink jet printer or a laser printer.

3. The method of claim 1, wherein an ejecting speed of the coating material is 1 to 20 kHz.

4. The method of claim 1, wherein the coating composition further comprises: 1 to 2 wt % of a wetting agent, and 0.01 to 1 wt % of a defoamer.

5. The method of claim 1, wherein the silane-based compound is one or more selected from the group consisting of epoxy-based silane and amino-based silane.

6. The method of claim 1, wherein the organic acid is one or more selected from the group consisting of formic acid and acetic acid.

7. The method of claim 1, wherein the coating layer has a gloss of 80 or more at 60°.

8. The method of claim 1, wherein the matting agent is one or more selected from the group consisting of silica, alumina, wax, ceramic and synthetic polymer powder.

9. The method of claim 1, wherein the bubbles have an average diameter of 0.5 to 3 μm.

10. The method of claim 1, wherein the matte coated film layer has a thickness of 1 to 20 μm.

11. The method of claim 1, wherein the matte coated film layer has a gloss of 3 to 50 at 60°.

* * * * *